United States Patent [19]

Howes

[11] Patent Number: 4,749,761

[45] Date of Patent: Jun. 7, 1988

[54] HYDROGEL POLYMERS

[75] Inventor: John G. B. Howes, Hertford Heath, United Kingdom

[73] Assignee: Smith & Nephew Associated Companies p.l.c., England

[21] Appl. No.: 7,326

[22] Filed: Jan. 27, 1987

[30] Foreign Application Priority Data

Jan. 28, 1986 [GB] United Kingdom ................ 8601949

[51] Int. Cl.$^4$ ............................................. C08F 26/08
[52] U.S. Cl. ............................................... 526/264
[58] Field of Search ....................................... 526/264

[56] References Cited

U.S. PATENT DOCUMENTS

| | | | |
|---|---|---|---|
| 3,639,524 | 2/1972 | Seiderman | 525/263 |
| 3,937,680 | 2/1976 | de Carle | 526/264 |
| 4,022,754 | 5/1977 | Howes et al. | 526/264 |
| 4,036,814 | 7/1977 | Howes et al. | 526/264 |
| 4,184,992 | 1/1980 | Hosaka | 526/264 |
| 4,361,689 | 11/1982 | Patel et al. | 526/264 |
| 4,463,148 | 7/1984 | Hofer et al. | 526/264 |
| 4,620,954 | 11/1986 | Singer et al. | 526/264 |

FOREIGN PATENT DOCUMENTS 61-26608  2/1986  Japan .................. 526/264

Primary Examiner—Joseph L. Schofer
Assistant Examiner—N. Sarofim
Attorney, Agent, or Firm—Jacobs & Jacobs

[57] ABSTRACT

A cross-linked, hydrogel polymer for contact lenses with a water uptake of between 60 and 70% by weight based on the total weight of hydrogel is formed from a mixture of monomer components containing (1) N-vinyl-2-pyrrolidone, (2) alkyl methacrylate and (3) a compound of formula

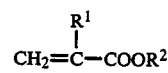

in which $R^1$ is hydrogen or a lower alkyl group, preferably methyl, and $R^2$ is either a substituted or unsubstituted aryl group or an alkyl group containing from 1 to 6 carbon atoms substituted by a substituted or unsubstituted aryl group or a substituted or unsubstituted aryloxygroup or by a cycloalkyloxygroup. Preferably the alkyl methacrylate is hydroxyethyl methacrylate and the third component phenethyl methacrylate. Cross-linking agents used preferably have their two functional groups differing in reactivity, for example allyl methacrylate.

14 Claims, No Drawings

HYDROGEL POLYMERS

This invention relates to cross-linked hydrogel polymers and to their preparation and use. More particularly this invention relates to hydrogel polymers which are useful for the manufacture of medical prostheses and especially of contact lenses.

It is well known to make contact lenses from hydrogel polymers. However, the requirements needed of an ideal hydrogel polymer for this use are such that it may be argued that none of the hydrogel materials currently used to form contact lenses are entirely satisfactory. Indeed the numerous proposals made in the patent literature for hydrogel contact lenses during the last twenty to thirty years shows how the search for the ideal polymer has been pursued by a number of workers. These previously known hydrogel polymers succeed in fulfilling some of the requirements needed but are unsatisfactory on others. The requirements of an ideal lens polymer include (1) hard and machinable when unhydrated and when hydrated they should (2) have good elastic recovery, (3) be clear, (4) have high permeability to water and oxygen on hydration. Previously some of these requirements have proved to be mutually incompatible, so it has proved difficult to produce a hydrogel polymer which has a high water content, that is has a high permeability to water and oxygen, yet has also adequate strength or to produce a hydrogel polymer which has strength without it being relatively inelastic.

I have now found hydrogel polymers, as hereinafter defined, that satisfy the above requirements with regard to strength and elasticity and which surprisingly have a high water content and which can show a wide range of tensile strength and elastic properties over a narrow range of suitable water content values.

Accordingly the present invention provides a cross-linked, hydrogel polymer material capable of an uptake of water of between 60 and 70% by weight based on the total weight of hydrogel, said material being formed from a mixture of monomer components containing (1) N-vinyl-2-pyrrolidone, (2) alkyl methacrylate and (3) a compound of formula

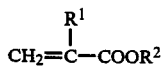

in which $R^1$ is hydrogen or a lower alkyl group and $R^2$ is either a substituted or unsubstituted aryl group or an alkyl group containing from 1 to 6 carbon atoms substituted by a substituted or unsubstituted aryl group or by a substituted or unsubstituted aryloxy group or by a cycloalkyloxy group.

Suitably the hydrogel polymer material can be capable of an uptake of water of between 60 and 70% by weight based on the total weight of hydrogel. This will provide the hydrogel polymer with a sufficiently high permeability to water and oxygen to reduce the risk of causing anoxia (lack of oxygen) or oedema to the cornea during wear. These disorders can occur on wearing contact lenses of lower water content for example 38%. Preferably the hydrogel polymer material will be capable of an uptake of water of between 65 and 68% by weight.

The first and hydrophilic monomeric component used to form the hydrogel polymer material is a water soluble N-vinyl lactam, N-vinly-2-pyrrolidone. Suitably the mixture of monomers components used to form the hydrogel polymer materials of the present invention may contain from 55 to 70% by weight of N-vinyl-2-pyrrolidone and preferably will contain from 56 to 67% by weight.

The second component used to form the hydrogel polymer material of the invention may be a hydrophilic or hydrophobic component depending upon the required properties of the final hydrogel and will comprise alkyl methacrylate which may be as a single monomer or as a mixture of two or more such monomers. The alkyl group may be a straight chain or branched chain and contain from 1 to 6 carbon atoms which optionally may be substituted by a substituent such as a hydroxyl group. A suitable alkyl methacrylate is methyl methacrylate however a preferred methacrylate is a hydroxyalkyl methacrylate of which the most preferred is 2-hydroxyethyl methacrylate.

Suitably the mixture of monomer components used to form the hydrogel polymer material of the invention can contain from 15 to 30% by weight of methacrylate and preferably will contain from 18 to 30%.

The third component used to form the hydrogel material of the present invention is a compound of formula

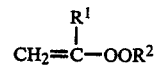

in which $R^1$ is hydrogen or a lower alkyl group containing from 1 to 4 carbon atoms and $R^2$ is either a substituted or unsubstituted aryl group or an alkyl group containing from 1 to 6 carbon atoms substituted by substituted or unsubstituted aryl group or by substituted or unsubstituted aryloxy group or by cycloalkyloxy group.

It is preferred for the Group $R^1$ to be methyl that is the compound of the formula given is a methacrylate ester.

It is preferred that the substituted alkyl group $R^2$ should contain one or especially two carbon atoms.

The aryl substituent described above usually comprises one or two six-membered carbocyclic rings. It can be a mononuclear, fused binuclear or other binuclear radical but preferably is a mononuclear radical such as phenyl or the corresponding phenoxy or phenyl-S-, phenyl-S(O)— or phenyl-S($O_2$)—.

Examples of suitable aryl substituents include phenyl,2-naphthyl, phenyl-S-, phenyl-S(O)- or phenyl-S($O_2$)- or the corresponding phenoxy, 2-naphthyloxy, (3-phenyl)phenoxy, (4-phenyl)phenoxy, (3-benzyl)phenoxy or (4-benzyl)phenoxy.

Optionally the aryl or aryloxy group can be substituted by one or two alkyl groups of straight or branched chain containing from 1 to 4 carbon atoms, one or two alkoxy groups of straight or branched chain containing from 1 to 4 carbon atoms, or one or two halogen atoms. Preferably the aryl or aryloxy groups are unsubstituted.

The alkyl group of the cycloalkyloxy group usually comprises 5 or 6 carbon atoms and preferably contains six carbon atoms, that is cyclohexyl.

The preferred third component is phenethyl methacrylate.

Other preferred third components include phenoxylethyl methacrylate and cyclohexyloxy methacrylate.

Suitably the mixture of monomer components used to form the hydrogel polymer material of the invention may contain from 10 to 25% of a compound of formula (I).

The hydrogel polymer materials described above are cross-linked by the addition to the monomer components of a di-functional compound in an amount which will give the required degree of cross-linking. Usually the amount of cross-linking agent used will be between 0.1 and 5% by weight, depending upon the type used and preferably will be between 0.2 and 2%. Suitable cross-linking agents include those having symetrical molecules like methylene biacrylamide and ethylene glycol dimethyacrylate but it is preferred that in the cross-linking agent the functional groups differ in reactivity, usually by virtue of their point of attachment to the remainder of the molecule. Particular examples are monoesters of methacrylic acid with unsaturated aliphatic radicals, for example allyl methacrylate.

The present invention also provides a method of producing a cross-linking hydrogel polymer material in which the monomer components 1, 2 and 3 are mixed together with the cross-linking agent and a catalyst which promotes free-radical polymerisation. The mixture is heated to 35° C. to 50° C. for up to 50 hours in the absence of oxygen, then for 1 to 3 hours at 60° C. to 80° C. and finally at 1 to 3 hours at 100° C. to 120° C.

While this invention is predominantly concerned with polymers formed from three monomer components, the polymers may be formed from mixtures containing additional copolymerisable monomers provided of course they do not adversely affect the desired properties of the hydrogel.

The present invention also provides a contact lens manufactured form the hydrogel polymer material.

In one preferred aspect the present invention provides a cross-linked, hydrogel polymer material capable of an uptake of water of between 60 and 70% by weight based on the total weight of hydrogel, said material being the polymerisation product of a mixture of monomers containing from 56 to 67% by weight of N-vinyl-2-pyrrolidone, from 18 to 30% by weight of alkyl methacrylate selected from the group consisting of methyl methacrylate and hydroxyethyl methacrylate, from 10 to 25% of phenethyl methacrylate and from 0.1 to 5% by weight of cross-linking agent.

The present invention also provides a contact lens formed from this hydrogel polymer.

EXAMPLE 1

Preparation of Hydrogel Polymer Material

A mixture of the following monomer components was prepared, N-vinyl-2-pyrrolidone (56.2 parts by weight), phenethyl methacrylate (10 parts by weight), 2-hydroxyethyl methacrylate (33.3 parts by weight) and a cross-linking agent allyl methacrylate (0.27 parts by weight). A free-radical polymerisation catalyst azobisisobutyronitrile (0.15 parts by weight) was added and dissolved. The mixture was filtered, placed in a mould and degassed. The initial polymerisation was carried out on a constant temperature enclosure at 38° to 42° C. with exclusion of oxygen over a period of up to 45 hours. The second stage of the polymerisation was carried out at 65° C. to 75° C. for up to 3 hours and finally at 100° C. to 120° C., for example 110° C. for a further 3 hours.

The resultant polymer material, in this case in the form of a disc of 15 mm diameter and 4 mm thick, was immersed in 25 ml of a 0.9% by weight aqueous sodium chloride solution at 20° C. and allowed to reach equilibrium, that is when no further change in the weight of the hydrated polymer was observed over a 24 hour period. The water uptake was 65.1%.

The ultimate tensile strength (UTS) was measured by the method described in ASTMD 1708 in which dumbell-shaped samples of the hydrated polymer were placed at a gauge length of 1.54 cm in the jaws of an Instron (trade mark) test machine which moved apart at a speed of 5 cm/min, the sample being immersed in saline for the duration of the test. The results are shown in MPa. The 10% T denotes the force required for 10% elongation, and is measured from the graph obtained during the UTS test above. The ultimate tensile strength is a measure of the strength of the material and 10% T an indication of its stiffness.

Contact lenses may be made from the hydrogel polymer materials as follows. The polymer is made in the form of a button that is a cylinder which has a diameter of about 12.7 mm and a thickness of 6 mm. The polymer in its unhydrated state is hard and may be machined using a lathe and cutter. Knowing the swellability factor of the polymer that is the amount by which the polymer swells on hydration, the button is shaped to the appropriate dimensions and then hydrated in sterile physiological saline at room temperature whereupon the polymer swells to an overall diameter of between 17.3 and 17.5 mm to give a clear, flexible contact lens.

EXAMPLE 2

Preparation of Hydrogel Polymeric Material

A similar preparation to that described in Example 1 was carried out using the following mixture of monomeric components N-vinyl-2-pyrollidone (61 parts by weight) phenethyl methacrylate (17.4 parts by weight) and 2-hydroxy ethyl methacrylate (21.2 parts by weight) and the same amount of cross-linking agent and catalyst as in Example 1.

On hydration the water uptake was 65.2% by weight.

The invention will be further described with reference to the following table, which indicates certain properties of the preferred methacrylic esters when polymerised with N-vinyl-2-pyrollidone and also shown the properties of certain other polymers.

| | Water Content % by weight hydrogel | N—vinyl-2-pyrrolidone % by weight | Phenethyl methacrylate % by weight | HEMA % by weight | Ultimate Tensile Strength | Load to 10% | |
|---|---|---|---|---|---|---|---|
| Example | | | | | | | |
| 1 | 65 | 56.5 | 10 | 33.5 | 0.35 | 0.16 | Clear |
| 2 | 65 | 62.0 | 17.5 | 20.5 | 1.13 | 0.45 | Clear |
| 3 | 68 | 61.3 | 10 | 28.7 | 0.33 | 0.17 | Clear |
| 4 | 68 | 66.8 | 17.5 | 15.7 | 1.10 | 0.45 | Clear |
| Comparative Example | | | | | | | |
| A | 38 | — | — | 100 | 0.67 | 0.45 | Clear |

|   | Water Content % by weight hydrogel | N—vinyl-2-pyrrolidone % by weight | Phenethyl methacrylate % by weight | HEMA % by weight | Ultimate Tensile Strength | Load to 10% |   |
| --- | --- | --- | --- | --- | --- | --- | --- |
| B | 65 | 73.5 | 26.5 | — | — | — | Hazy |
| C | 68 | 76.0 | 24.0 | — | — | — | Hazy |

EXAMPLES 5–8

A second series of hydrogel polymers was prepared in a similar manner to Example 1 in which the monomer mixture had the following compositions,

| Example | Water Content % by weight hydrogel | N—vinyl-2-pyrrolidone % by weight | Phenethyl-methacrylate % by weight | MMA % by weight |
| --- | --- | --- | --- | --- |
| 5 | 65.0 | 65.0 | 10.0 | 24.6 |
| 6 | 65.0 | 68.0 | 17.4 | 14.2 |
| 7 | 68.0 | 68.5 | 10.0 | 21.0 |
| 8 | 68.0 | 71.2 | 17.4 | 10.9 |

The cross-linking agent used was allyl methacrylate (0.27%) and the free-radical catalyst was azo bis isobutyronitrile (0.15%).

What is claimed is:

1. A cross-linked, hydrogel polymer material capable of an uptake of water of between 60 and 70% by weight based on the total weight of hydrogel, said material being formed from a mixture of monomer components containing (1) N-vinyl-2-pyrrolidone, (2) alkyl methacrylate and (3) a compound of formula (I)

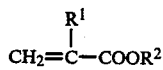
$$CH_2 = \overset{R^1}{\underset{|}{C}} - COOR^2 \qquad (I)$$

in which $R^1$ is hydrogen or a lower alkyl group and $R^2$ is either a substituted or unsubstituted aryl group or an alkyl group containing from 1 to 6 carbon atoms substituted by a substituted or unsubstituted aryl group or by a substituted or unsubstituted aryloxy group or by a cycloalkyloxy group.

2. A cross-linked, hydrogel polymer according to claim 1 in which the monomer mixture contains from 55 to 70% by weight of N-vinyl-2-pyrrolidone.

3. A cross-linked, hydrogel polymer according to claim 1 in which the monomer mixture contains from 15 to 30% by weight of alkyl methacrylate in which the alkyl group is a straight or branched chain containing from 1 to 6 carbon atoms optionally substituted by a hydroxyl group.

4. A cross-linked, hydrogel polymer according to claim 3 in which the alkyl methacrylate is hydroxyethyl methacrylate.

5. A cross-linked, hydrogel polymer according to claim 3 in which the alkyl methacrylate is methyl methacrylate.

6. A cross-linked, hydrogel polymer according to claim 1 in which the monomer mixture contains from 10 to 25% by weight of a compound of formula (I).

7. A cross-linked, hydrogel polymer according to claim 6 in which $R^1$ is methyl.

8. A cross-linked, hydrogel polymer according to claim 6 in which $R^2$ is an alkyl group containing two carbon atoms substituted by a substituted or unsubstituted aryl group or by a substituted or unsubstituted aryloxy group or by a cylcoalkyloxy group in which the aryl or cycloalkyl groups comprise a six-membered carbocyclic ring and in which the substituted aryl groups are substituted by one or two alkyl groups of straight or branched chains containing 1 to 4 carbon atoms, one or two alkoxy groups of straight or branched chain containing from 1 to 4 carbon atoms or one or two halogen atoms.

9. A cross-linked, hydrogel polymer according to claim 8 in which $R^2$ is a phenethyl group.

10. A cross-linked, hydrogel polymer according to claim 8 in which $R^2$ is a cyclohexyloxyethyl group.

11. A cross-linked, hydrogel polymer according to claim 1 in which the polymer is cross-linked with between 0.1 and 5% by weight of cross-linking agent.

12. A cross-linked, hydrogel polymer according to claim 10 in which the polymer is cross-linked with between 0.2 and 2% by weight of a cross-linking agent having two functional groups which differ in reactivity.

13. A cross-linked, hydrogel polymer material capable of an uptake of water of between 60 and 70% by weight based on the total weight of hydrogel, said material being the polymerisation product of a mixture of monomers containing from 56 to 67% by weight of N-vinyl-2-pyrrolidone, from 18 to 30% by weight of alkyl methacrylate selected from the group consisting of methyl methacrylate and hydroxyethyl methacrylate, from 10 to 25% of phenethyl methacrylate and from 0.1 to 5% by weight of cross-linking agent.

14. A cross-linked, hydrogel polymer material according to claim 13 in which there is present from 0.2 to 2% of a cross-linking agent having two functional groups which differ in reactivity.

* * * * *